United States Patent [19]

Beholz

[11] Patent Number: 6,077,913
[45] Date of Patent: *Jun. 20, 2000

[54] PROCESS FOR PRODUCING PAINTABLE POLYMERIC ARTICLES

[75] Inventor: Lars Guenter Beholz, Flint, Mich.

[73] Assignee: Beholz Technology, L.L.C., Flint, Mich.

[*] Notice: This patent is subject to a terminal disclaimer.

[21] Appl. No.: 09/048,609

[22] Filed: Mar. 26, 1998

[51] Int. Cl.$^7$ ........................................................ C08F 8/06
[52] U.S. Cl. .................. 525/337; 525/329.1; 525/329.2; 525/330.3; 525/331.5; 525/333.3; 525/333.7; 525/359.3; 525/367; 525/374; 427/308; 427/444
[58] Field of Search ................................ 525/337, 359.3, 525/367, 374; 427/308, 444

[56] References Cited

U.S. PATENT DOCUMENTS

| | | |
|---|---|---|
| 2,668,134 | 2/1954 | Horton . |
| 3,235,426 | 2/1966 | Bruner . |
| 3,553,085 | 1/1971 | Heymann . |
| 3,561,995 | 2/1971 | Wu . |
| 3,660,293 | 5/1972 | Maguire et al. . |
| 3,686,016 | 8/1972 | Maguire et al. . |
| 3,689,303 | 9/1972 | Maguire et al. . |
| 3,695,915 | 10/1972 | Morris . |
| 3,730,757 | 5/1973 | Knorre . |
| 3,869,303 | 3/1975 | Orlov et al. . |
| 3,888,702 | 6/1975 | Kujawa et al. . |
| 4,086,128 | 4/1978 | Sugio et al. . |
| 4,386,175 | 5/1983 | Kuramochi et al. . |
| 4,448,811 | 5/1984 | Doty et al. . |
| 4,724,057 | 2/1988 | Ebisawa et al. . |
| 4,835,016 | 5/1989 | Rosty et al. . |
| 5,053,256 | 10/1991 | Haag . |
| 5,143,592 | 9/1992 | Toro . |
| 5,198,096 | 3/1993 | Foust et al. . |
| 5,232,604 | 8/1993 | Swallow et al. .......................... 210/759 |
| 5,242,544 | 9/1993 | Itoh et al. . |
| 5,442,042 | 8/1995 | Zeiner et al. . |
| 5,585,187 | 12/1996 | Shinonaga et al. . |
| 5,670,582 | 9/1997 | Chung et al. ............................ 525/356 |

OTHER PUBLICATIONS

*Modern Plastics*, "Appendix: Numerical Specification Index", Mid–Nov., 1995, pp. B143–B144.

*Primary Examiner*—Bernard Lipman
*Attorney, Agent, or Firm*—Young & Basile, P.C.

[57] ABSTRACT

A method for improving surface adhesion characteristics of a polymer substrate in which the portion of the surface of the polymeric substrate to be treated is contacted with a fluid material containing at least one oxidizing agent. The oxidizing agent in the fluid material is present in a kinetically degrading state capable of producing at least one chemical intermediate which is reactive with the polymeric substrate. Contact between the fluid containing the oxidizing agent and the polymeric substrate is maintained for an interval sufficient to produce or modify functional groups in the polymeric substrate proximate to its surface. The oxidizing agent of choice is a bivalent oxygen compound. The oxidizing agent is activated by an activator agent containing at least one carboxylic acid group or derivative thereof. The activator agent may be present in the fluid upon initial contact with the polymeric substrate or may be added to the fluid subsequent to initial contact with the polymeric substrate.

23 Claims, No Drawings

PROCESS FOR PRODUCING PAINTABLE POLYMERIC ARTICLES

BACKGROUND OF THE INVENTION

I. Field of the Invention

The present invention relates to a process for improving adhesion characteristics of a polymeric substrate surface.

II. Brief Description of Relevant Art

Polymeric materials provide excellent and versatile mechanical qualities and find use in a wide variety of applications. In certain instances, it is necessary to coat the surface of polymeric materials to meet aesthetic requirements or to provide a protective surface to help the polymeric substrate withstand degradation. Providing a high quality durable painted surface on certain polymeric substrates has been problematic due to generally poor surface adhesion qualities exhibited by various polymeric substrate materials. Poor surface adhesion is also problematic in situations in which other laminates, films or metallic layers are to be imparted onto the polymer. Situations can also include bonding of one polymer substrate to another polymeric material or to non-polymeric substrates.

To this end, much activity has been devoted to providing polymers with improved surface adhesion characteristics and to improving the surface adhesion characteristics of known polymeric materials. Methods include roughening of polymeric surfaces by exposure to strong mineral acids with or without the presence of strong oxidizers such as chromates, permanganates and the like.

Other adhesion promotion methods involve the use of strong mineral acids in combination with concentrated mineral oxidants and strong mineral acid salts in aqueous treatment solutions. This art is taught in U.S. Pat. No. 3,869,303 to Orlov et al. Problems associated with the use of such strong mineral acids and toxic oxidizers include handling and disposal risks as well as the potential that the polymeric surface and substrates may be excessively degraded or compromised. Additionally, it is possible that the resulting polymeric substrate surface may be susceptible to unwanted oxidation or the like, necessitating immediate coating with the desired coating material.

Treatment of polyolefin materials for adhesive bonding using a non-chromate solution containing sulfuric acid in the presence of either lead dioxide, potassium iodate or ammonium persulfate is taught in U.S. Pat. No. 4,835,016 to Rosty et al. The Rosty reference also discusses the use of a solution containing bleach and detergent. In order to be effective, the Rosty reference teaches that the polymeric samples must be submersed in the prescribed solution for several days. Such protracted exposure is simply not practical in many treatment operations.

Treatment methods are also known which teach the use of peroxydisulfuric acid solutions with the optional use of accelerants capable of activating peroxydisulfuric acid oxidation reactions. In U.S. Pat. No. 3,695,915 to Morris, metal salts such as copper, ferrous or silver salts of sulfuric acid or nitric acid are employed to increase the rate of evolution of oxygen. Care must be taken in employing the process disclosed in Morris lest excess concentrations of deleterious sulfuric acid are produced.

In U.S. Pat. No. 5,05,256 to Haag, a method for improving adhesion of paints to polydicyclopentadiene is proposed. A solution containing sodium hypochlorite and, preferably, a detergent is applied to the polymer by wiping. The solution is allowed to remain on the polymer surface for a 40 minute interval and is then washed off. Polydicyclopentadiene presents a unique and exotic polymeric structure. Without being bound to any theory, it is believed that the large number of unsaturated carbon-carbon linkages in the cyclic functionalities provides a material uniquely susceptible to interaction with hypochlorite compounds. Unfortunately, the method described in Haag has not been readily adaptable to other more commonplace polymers.

Heretofore, no method has been proposed which promotes surface adhesion characteristics of a broad range of polymeric substrates in an efficient, economical manner which reduces reliance on chemical compounds which present handling and disposal difficulties; and, it is an object of the present invention to provide such a method. Since many of the compounds previously suggested for polymeric adhesion promotion are costly, difficult to obtain, or present handling or disposal problems, it is a further object of the present invention to provide a method for improving surface adhesion characteristics of common polymeric substrates which employs relatively low-cost chemical commodities in an easily handled fluid medium such as an aqueous solution which does not require undue special handling considerations. It is also desirable that the method yield relatively consistent treatment results and be easy to implement and monitor in a plant or manufacturing setting. It is desirable that improvements in polymeric surface adhesion be accomplished in a rapid and uniform manner over the entire targeted polymeric surface area. Finally, it is desirable that the adhesion improvement method be one which yields sufficiently permanent improvement in adhesion characteristics without unduly compromising other performance characteristics of the polymer.

SUMMARY OF THE INVENTION

The present invention is a method for improving surface adhesion characteristics of a polymer substrate in which the portion of the surface of the polymeric substrate to be treated is contacted with a fluid material containing at least one oxidizing agent. The oxidizing agent in the fluid material employed in the method of the present invention is present in a kinetically degrading state capable of producing at least one chemical intermediate which is reactive with the polymeric substrate. Contact between the fluid containing the oxidizing agent and the polymeric substrate is maintained for an interval sufficient to modify functional groups present in the polymeric substrate proximate to its surface. The oxidizing agent of choice is a bivalent oxygen compound. In the process of the present invention, the halogenated bivalent oxygen compound of choice is one which is capable of a controlled rate of oxidation and capable of activation to yield the desired kinetically degrading state. Activation may occur by any suitable mechanical or chemical mechanism by an activator agent containing a compound having at least one carboxylic acid group, a carboxylic acid derivative, or synthetic equivalents thereof. The activator agent may be present in the fluid upon initial contact with the polymeric substrate or may be added to the fluid subsequent to initial contact with the polymeric substrate.

DETAILED DESCRIPTION OF THE PREFERRED EMBODIMENTS

This invention is predicated upon the unexpected discovery that adhesion characteristics of a polymer substrate, particularly adhesion characteristics between the polymer substrate and an applied organic film can be significantly enhanced by processing the polymeric substrate with a fluid material which contains at least one oxidizing agent. The oxidizing agent of choice is a halogenated bivalent oxygen compound present in the fluid material in a kinetically degrading state. The oxidizing agent is capable of producing at least one chemical intermediate which is significantly reactive with functionalities present in the polymeric substrate. The kinetic degradation of the oxidizing agent is enhanced or augmented by the presence of an activator agent. The activator agent of choice is one containing a chemical compound which has at least one carboxylic acid group, a carboxylic acid derivative, or synthetic equivalents thereof. It has been found, quite unexpectedly, that oxidation of the bivalent oxygen compound proceeded at a controlled rate which is made useful by the creation of the kinetically degrading state.

As used herein, the term "kinetically degrading state" is defined as a non-equilibrium state in which the oxidizing agent, specifically the bivalent oxygen compound experiences a change in oxidation state over time with the oxidizing agent having its highest oxidation number in its highest concentration at a point closest to the initiation of the reaction process with a concomitant decrease in concentration of this species over time. The concentration of oxidizing agents having lower or lowest oxidation states is at its lowest at the outset of the method of the present invention with a concomitant increase in this species over time. The kinetically degrading state of the oxidizing agent produces at least one chemical intermediate which is reactive with the polymeric substrate. The chemical intermediate may be stable, unstable or transient. Stable intermediates can be defined herein as those which are readily isolatible for quantification and analysis. Unstable intermediates are defined herein as those which cannot be isolated for such quantification and analysis. Transient intermediates are considered those which react rapidly with the polymeric substrate or other components present in the system. Theoretic concepts for the chemical intermediates are presented subsequently.

As used herein, the term "oxidizing agent" is a chemical compound which readily gives up oxygen, accomplishes the removal of hydrogen from another, preferably organic, compound or serves to attract negative electrons to accomplish the eventual hydrogen removal from the target compound.

The term "controlled rate of oxidation" as used herein is defined as a chemical reaction rate which proceeds with efficient evolution of quantities of reactive intermediate sufficient to interact with the polymeric substrate. The oxidation process proceeds without generation of excessive quantities of by-product such as devolved gaseous product or the like.

In the method of the present invention, polymeric substrates for which adhesion improvement can be effected are, generally, those having hydrogens attached to carbon atoms characterized by large percentages of covalent carbon bonds; typically alkane linkages present throughout the polymeric lattice. Without being bound to any theory, it is believed that the presence of large numbers of covalent bonds in the polymeric lattice renders the polymeric material relatively unreactive and difficult to make adhesive. The polymeric materials of choice may be either thermosetting or thermoplastic materials. Examples of suitable polymers include addition polymers selected from the group consisting of polyolefins, substituted polyolefins, and polyolefin blends. Preferred polyolefins are addition polymers selected from the group consisting of polyethylene, polypropylene polyisobutylene, polystyrene, polyisoprene, polyethylene terephthalate, polybutylene terephthalate, polyvinyl chlorides, polyvinylidine chlorides, polyacrylonitriles, polyvinylacetates, and mixtures thereof. It has been found that the process of the present invention is particularly efficacious when performed on these addition polymers. Adhesive properties inherent in certain polyolefin addition polymers are particularly low. Modification of such properties to increase paintability of the polyolefin is highly desirable and, heretofore, limitedly successful.

While the process of the present invention is particularly directed to polyolefin addition polymers, it is to be understood that the process can also be employed to increase adhesive properties of other polymers which are generally recognized as more paintable. These latter polymers include halogenated polyalkyls and polyalkyl acrylates, selected from the group consisting of polyvinyl chloride, polymethyl methacrylate, polymethyl acrylate, and mixtures thereof.

Polyethylenes composed of substituted or unsubstituted alkalene monomers may also be treated by the process of the present invention. Examples of substituted alkylene polymers include polytetrafluorethylene, polytrichlorofluoroethylene and the like. Finally, other addition polymers can successfully be treated. This includes materials such as polyformaldehyde, polyacetaldehyde, polyisoprene and the like.

Condensation polymers which exhibit marked increases in adhesive ability include polyesters selected from the group consisting of polyethylene terephthalate, polybutylene terephthalate, and mixtures thereof. Other polymeric materials which can be treated by the process of the present invention can be condensation polymers such as those selected from the group consisting of polyamides, polyesters, polyurethanes, polysiloxanes, polyphenolformaldehydes, urea formaldehydes, melamineformaldehydes, cellulose, polysulfides, polyacetates, polycarbonates, and mixtures thereof.

The polymeric material employed in the substrate can also be a thermoplastic elastomer selected from the group consisting of styrene-isoprene-styrene, styrene-butadiene-styrene, copolyesters, copolyester ethers, silicone-polyamides, silicone-polyesters, silicone-polyolefins, silicone-styrenes, aromatic polyether-urethanes, alpha cellulose filled ureas, polyvinyl chloride-acetates, vinylbutyrals, and mixtures thereof.

The polymeric material employed in the substrate may further be a co-polymer selected from the group consisting of polyester-polyethers, polyether-polysiloxanes, polysiloxane-polyamides, polyesteramides, copolyamides, nylons, and mixtures thereof.

Various other polymeric materials suitable for use as the substrate include those listed in *Modern Plastics,* "Appendix: Numerical Specification Index," Mid-November 1995, at B-143–144.

It is also within the purview of this invention that the polymeric substrate can be a blend containing as a major constituent any of the enumerated polymers.

It is to be understood that various polymeric substrates have varying degrees of adhesion ability. Thus, the method of the present invention is most efficaciously employed for improving polymeric materials with relatively poor initial adhesion characteristics such as polyolefin polymeric substrates, polyester polymeric substrates and mixtures thereof. The specific polymeric substrates for which the adhesion improvement method of the present invention shows the most dramatic results are polymers selected from the group consisting of polyethylene, polypropylene, polystyrene, polyisobutylene, polyethylene terephthalate, polybutylene terephthalate and mixtures thereof. It is anticipated that the polymeric substrates most advantageously improved by the process of the present invention are those which contain one or more of the enumerated polymers as a major constituent thereof. It is also within the purview of this invention that the polymeric substrate may include other compounds such as plasticizers, fillers, oxidation stabilizers, colorants, and the like compatible with the adhesion improvement method of the present invention.

In the method of the present invention, at least a portion of the surface area of the polymeric substrate is contacted with a fluid material containing at least one oxidizing agent. It is anticipated that the method of the present invention can be successfully implemented on polymeric material which has been formed, extruded, or otherwise processed into a finished or intermediate part generally considered ready for painting or other processing for which increased adhesion characteristics are desired. Examples of such processes include, but are not limited to, joining, laminating and the like. It is within the purview of this invention that the entire polymeric substrate be contacted with the fluid material containing the oxidizing agent. However, it is also within the purview of this invention that the polymeric substrate be masked or otherwise prepared so that only the desired portion of the surface area of the polymeric substrate be so treated.

The fluid material containing the oxidizing agent may be any liquid or gaseous composition which is capable of containing and conveying the oxidizing agent into contact with the polymeric substrate surface to be treated. Preferably, the fluid material is an aqueous solution containing sufficient quantities of the oxidizing agent to effect the appropriate chemical reaction in the desired manner at the desired rate.

The oxidizing agent of choice is one which is capable of kinetically degrading from its highest oxidized state into lower intermediates in a controlled or controllable reaction mechanism. The oxidizing agent may also be a material which can be rendered capable of such kinetic degradation in a controlled rate of reaction.

The oxidizing material employed in the method of the present invention is a compound which will generally evolve halogen or a halogen analog at a controlled rate, particularly when brought into contact with materials containing functionality of carboxylic acid, carboxylic acid derivative, or synthetic equivalents thereof. As used herein, the term "halogen or a halogen analog" is defined as one of the electronegative elements of Group VIIA of the Periodic table or a material which will perform the same or similar function in the process of the present invention. Halogens preferably are selected from the group consisting of chlorine, bromine, iodine and mixtures thereof. Halogen analogs preferably are selected from the group consisting of boron, nitrogen and mixtures thereof.

In the process of the present invention, the oxidizing agent of choice is a halogenated bivalent oxygen compound which is selected from the group consisting of oxycompounds of chlorine, oxycompounds of bromine, oxycompounds of nitrogen, and mixtures thereof. Without being bound to any theory, it is believed that the selected oxidizing compounds kinetically degrade into an intermediate.

Oxycompounds of chlorine which can be utilized as the bivalent oxygen oxidizing agent are selected from the group consisting of hypochlorous acid, alkali metal salts of hypochlorous acid and hydrates thereof, alkaline earth metal salts of hypochlorous acid and hydrates thereof, perchloric acid, alkali metal salts of perchloric acid and hydrates thereof, alkaline earth metal salts of perchloric acid and hydrates thereof, chloric acid, alkali metal salts of chloric acid and hydrates thereof, alkaline earth metal salts of chloric acid and hydrates thereof.

Oxycompounds of bromine which can be utilized as the bivalent oxygen oxidizing agent are selected from the group consisting of hypobromous acid, alkali earth metal salts of hypobromous acid and hydrates thereof, alkaline earth metal salts of hypobromous acid and hydrates thereof, bromic acid, alkali metal salts of bromic acid and hydrates thereof, alkaline earth metal salts of bromic acid and hydrates thereof.

Oxycompounds of iodine which can be employed as the bivalent oxygen compound of the present invention are selected from the group consisting of iodic acid, alkali metal salts of iodic acid and hydrates thereof, alkaline earth metal salts of iodic acid and hydrates thereof, periodic acid, alkali metal salts of periodic acid and hydrates thereof, alkaline earth metal salts of periodic acid and hydrates thereof.

Oxycompounds of boron which can be employed as the bivalent oxygen compound of the present invention are selected from the group consisting of boric acid, alkali metal salts of boric acid and hydrates thereof, alkaline earth metal salts of boric acid and hydrates thereof, perboric acid, alkali metal perborates and hydrates thereof, alkaline earth metal perborates and hydrates thereof.

Oxycompounds of nitrogen which can be employed as the bivalent oxygen oxidizing agent are selected from the group consisting of nitric acid, alkali metal salts of nitric acid and hydrates thereof, alkaline earth metal salts of nitric acid and hydrates thereof.

The oxycompound of choice is preferably a compound or mixture of compounds which will kinetically degrade in a controlled, essentially steady manner to provide chemical intermediates which are reactive with the polymeric substrate.

Preferred oxycompounds employed as the oxidizing agent in the process of the present invention are selected from the group consisting of hypochlorous acid, alkali metal salts of hypochlorous acid, hydrates of hypochlorous acid, alkaline earth metal salts of hypochlorous acid, hydrates of alkaline earth metal salts, and mixtures thereof. Examples of oxidizing agents include hypochlorous acid, calcium hypochlorite, sodium hypochlorite, calcium hypochlorite tetrahydrate, lithium perchlorate, lithium perchlorate trihydrate, magnesium perchlorate, magnesium perchlorate dihydrate, potassium chlorate, sodium perchlorate, lithium nitrate, magnesium iodate tetrahydrate, magnesium nitrate hexahydrate, nitrosalicylic acid, sodium perborate tetrahydrate. In the preferred embodiment, the oxidizing agent is selected from the group consisting of hypochlorous acid, calcium hypochlorite, sodium hypochlorite, lithium perchlorate, magnesium perchlorate, sodium perchlorate, potassium chlorate, and mixtures thereof. In the most preferred embodiment, the oxidizing agent is selected from the group consisting of sodium hypochlorite, calcium hypochlorite, calcium hypochlorite tetrahydrate, and mixtures thereof.

The oxidizing agent is preferably present in aqueous solution in a concentration sufficient to provide material which can kinetically degrade to an intermediate which will interact with the polymeric substrate with which it is brought into contact.

In the process of the present invention, the oxidizing agent is maintained in an aqueous solution at a concentration between about 0.25% and 25% by volume, with an oxidizing agent concentration between about 0.5% and about 5.25% by volume being preferred and an oxidizing agent concentration between about 2.6% and about 5.25% by volume being most preferred. It should be noted that an oxidizer concentration of 5.25% is the concentration of bleach.

It is within the purview of the present invention that other liquid or gaseous material can be employed as an activating agent for the oxidizing agent, provided that the liquid or gaseous material does not adversely interact with the oxidizing agent or polymeric substrate. However, aqueous solutions are most preferred for purposes of economy and handling ease.

The oxidizing agent may be employed in combination with a suitable activating agent capable of preferably reacting with the oxidizing agent to produce the intermediate species which is, in turn, reactive with the polymeric substrate. The activating agent is an organic material or derivative thereof having at least one carboxylic acid functionality or derivative thereof.

The activating agent employed in the process of the present invention is selected from the group consisting of carboxylic acids, anhydride derivatives of carboxylic acids, and halide derivatives of carboxylic acids, selenic acid derivatives of carboxylic acids, perchloric acid derivatives of carboxylic acid, boric acid derivatives of carboxylic acid dicarboxylic acid, anhydride derivatives of dicarboxylic acid, acid halide derivatives of dicarboxylic acid, selenic acid derivatives of dicarboxylic acid, boric acid derivatives of dicarboxylic acid, synthetic equivalents of the above-mentioned compounds, and mixtures thereof.

Carboxylic acids suitable for use as an activating agent have the general formula shown immediately below. Note that the "H" or the "OH" in the following formula may or may not be present in some of the derivatives, eg. acid chlorides and DCC coupled carboxylic acids (used in peptide chemistry). Some of these derivatives, such as the acid chlorides, may be too reactive to exist in aqueous solutions and quickly break down to the corresponding carboxylic acid. It is possible that the acid chlorides could be added to the present reaction mixture with the expectation that they would break down to form the desired activating compound. Some other additional suitable "acids" may include hydroxylamine hydrochloride, phosphorous pentachloride, phosphorous pentoxide, phosphoryl chloride, sulfurous acid, sulfuryl chloride, thionyl chloride, and, less preferably, phenols and catechols (these are both weakly acidic). The carboxylic acid general formula is as follows:

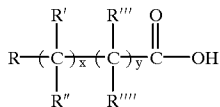

wherein x and y are integers between 0 and 20 inclusive with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R'" and R"" is a functionality selected from the group consisting of hydrogen, amines, hydroxyl, phenyl, phenol radicals, and mixtures thereof, each of the above-mentioned R variable functionalities being chosen independently of the other R variable functionalities, and wherein R" may also be selected from the group consisting of anhydrides, halide salts, selenic acid salts, perchloric acid salts, boric acid salts, and mixtures thereof.

Dicarboxylic acids suitable for use as an activating agent have the general formula:

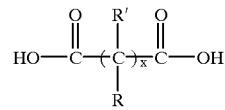

wherein x is an integer between 1 and 20 inclusive, and R and R' are functionalities selected from the group consisting of hydrogen, hydroxyl radicals, amines, phenol radicals, and mixtures thereof.

It is to be understood that the numbers mentioned above in both formulae for the number of carbons represented by "x" and "y" represent most "simple" molecules. However, it is to be understood that these formulas are illustrative, and the present invention is not to be limited thereto. Within the purview of the present invention, there is no real limit on the number of carbons represented by "x" and "y."0 In the extreme case of polymers, x and y would simply be between 2000 and 500,000. Also, in the instance of polymers, the number and distribution of x and y could vary greatly from ordered to random and from alternating to block.

Although it is to be understood that suitable polymers are contemplated as being effective activating agents, testing seems to indicate that any increase in chain length tends to compete with the polymer being treated for the reactive species. This was true for both the addition of surfactants and PEG as well as PVA. In the case of the surfactant, the rate of treatment was greatly decreased. In the case of both PEG and PVA, attempts to mix them with sodium hypochlorite resulted in a violent reaction. This would suggest that these polymers could thus diminish the performance of the system by reacting with the reactive species in solution as opposed to the polymer to be treated. It is to be understood, however, that this may not always be the case.

An example of a polymer which may degrade in water to yield an acid suitable for use as the activating agent includes, but is not limited to polyphosphoric acid. Examples of suitable acidic polymers include, but are not limited to poly(melamine-co-formaldehyde)s, polyacrylic acids, and salts thereof.

Further, regarding each of the R variables mentioned hereinabove, ie. R, R', R", etc., it is to be understood that the R groups are not intended to be limited to the above-identified species. For example, in a random branched polymer, the R groups may include a nearly infinite array; eg. the R groups may contain repeating ether linkages (such as in PEG), repeating amide linkages (such as in the polyamides), etc. The R groups may also contain combinations of any variety of functional groups. Another possibility is that one R group may be attached to another R group forming a ring. These rings may also contain functionality and branching. Furthermore, any of the branches in any of the aforementioned systems may be terminated with an additional functional group. A partial listing of functional groups that are commonly found in or at the end of molecules include: ethers, esters, amides, ketones, aldehydes, alcohols, nitriles, alkenes, alkynes, cyano groups, sulfur, sulfates, phosphor, phosphates, nitrogen, amines, nitro groups, as well as diazonium species etc. This presents a nearly infinite array of possibilities.

Suitable carboxylic acids include butyric acid, lactic acid, propionic acid, heptanoic acid, formic acid, and mixtures thereof. Derivatives of these mild carboxylic acids are also contemplated, as well as synthetic equivalents thereof. Specifically contemplated are acid anhydrides, acid chlorides, acid bromides and polyacids, such as heptanoic acid, butyric anhydride, heptanoic anhydride and the like. Examples of acid chlorides which can be effectively employed include palmitic chloride, fumeryl chloride, and the like.

Suitable dicarboxylic acids, acid derivatives, and synthetic equivalents thereof include dicarboxylic acids such as oxalic acid, malonic acid, succinic acid, glutaric acid, adipic acid, pimelic acid, maleic acid, and fumaric acid. It is within the purview of this invention that the activating agent be a mixture of these compounds. It is also within the purview of this invention that the activating agent be a derivative of dicarboxylic acid including, but not limited to, acid anhydrides, acid chlorides, acid bromides and polyacids. Particular examples of these include, but are not limited to materials such as acetic anhydride, oxalic acid dihydrate, acetile bromide, acetile chloride, 2 acetile benzoic acid, 4 acetile benzoic acid, bromoacetic acid, calcium oxylate, chlorobenzoyl chloride, 3 chlorobenzoyl chloride, citric acid, citric acid monohydrate, bibenzilazodicarboxylate, diglycolic acid, fumaric acid, furmeryl chloride, galic acid, galic acid monohydrate, oxalic acid, subasic acid, pyruvic acid, succinic acid, succinic anhydride, succinyl chloride, 5 sulfosalicylic acid, tannic acid, tartaric acid, and mixtures thereof.

An additional class of dicarboxylic acids includes the bridged carboxylic acids of the phthalate and succinimide types, such as terephthalic acid and succinimide.

It is to be understood that the amino acids and poly-amino acids form another class of acids contemplated as being effective activating agents. Suitable examples thereof include, but are not limited to aspartic acid and polyaspartic acid.

In the preferred embodiment, the activating agent of choice is one which, when added to the solution containing the oxidizing agent will result in the dissolution of the activating agent and dispersal throughout the solution. The addition of activating agent may also lead to an increase in solution temperature depending upon the particular activating agent employed and the amount added. Preferably, the amount and particular activating agent employed produces a rate of kinetic degradation of oxidizing agent which is manageable and yields a treatment solution which will provide for prolonged successful polymeric surface adhesion promotion. Ideally, the rate of kinetic degradation is one which will permit use of the treatment solution for intervals upwards of a day before replacement or recharging is required, with use intervals of seven to ten days being preferred. The interval during which the treatment solution is active will vary depending upon parameters such as temperature, the amount of polymeric substrate treated and the like.

In the process of the present invention, the activating agent is maintained in an aqueous solution at a concentration between about 0.01% and 5.0% by volume, with an activating agent concentration between about 0.05% and about 0.53% by volume being preferred, and an activating agent concentration between about 0.26% and about 0.53% by volume being most preferred.

In the process of the present invention, the activating agent material is preferably one which will promote dissolution of the activating material without liberation of undesirable gasses such as halogen gas or other unsuitable byproducts. In the preferred embodiment, the amount of activating agent employed is that sufficient to produce reactive intermediate capable of adhering to and/or interacting with the polymeric substrate. In the preferred embodiment, it is anticipated that the reactive intermediates react with the plastic substrate to add functionality which improves the adhesive properties of the polymeric material without unduly compromising polymeric performance.

Other compounds, although less preferred, may be used as the activating agent, including but not limited to potassium acetate, hydrochloric acid, and hydrogen peroxide.

It is to be understood that radical initiators are also contemplated as being effective activating agents. Some suitable examples include, but are not limited to 2,2-Azobis (2-methylpropionitrile) (AIBN), benzoyl peroxide, 4-bromomethyl-2,2,5,5-tetramethyl-3-imidazoline-3-oxide-1-oxyl free radical, and 3-chloroperoxybenzoic acid. It is to be further understood that the activating agent may include a mixture of: any of the suitable acid activating agents disclosed herein; and any of the suitable radical activating agents disclosed herein.

It is to be yet further understood that the solid supported acids or acid catalysts are also contemplated as being effective activating agents. These include three main categories: ion exchange resins; other resins to which acidic functionality has been added; and acid washed resins. Resins that could be used, modified and/or acid washed include paper, cellulose, starch, magnesium silicate, calcium silicate, silica, silicon dioxide, silicic acid, fluoricil, magnesium oxide, alumina, and activated carbon.

In the most preferred embodiment, the activating agent is selected from the group consisting of acetic anhydride, oxalic acid, formic acid, and mixtures thereof. An advantage of oxalic acid is that it is a solid at room temperature and is thus relatively easy to handle and clean up. Oxalic acid also has no significant odor and thus may eliminate a potential inhalation hazard which may be associated with the use of acetic anhydride (a strong lacrimator).

Without being bound to any theory, it is believed that the reaction proceeds according to the following mechanism. In that reaction mechanism, admixture of a hypochloride material such as sodium hypochloride in water yields the predominant active species hypochlorous acid as outlined in Equation I.

I.

Without being bound to any theory, it is believed that the activating agent may react with the oxidizer as exemplified by the reaction of oxalic acid with hypochlorous acid. It is believed that oxalic acid activates the hypochlorous acid and functions as a lewis acid to yield a hydroxyl ion. A radical reaction between hypochlorous acid and oxalic acid may thus proceed yielding hydrochloric acid, carbon dioxide and a carboxyl radical with concomitant generation of carbon dioxide as hypothesized in Equation II.

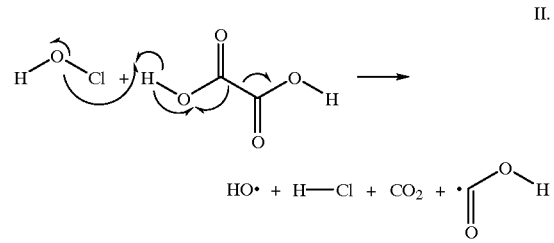

II.

The radicals formed in the initial decomposition may react directly with the polymeric substrate, react to form other radicals, or combine in termination steps to remove the reactive species from solution. One example of a radical reaction to form other radicals is outlined in Equation III.

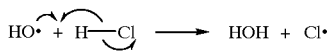

III.

Examples of theoretical termination reactions are outlined in Equations IVa and IVb.

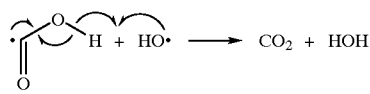

IVa.

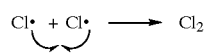

IVb.

Representative examples of reactive species reacting with functional groups on the polymeric substrate, in this instance, polyethylene, are set forth in Equation V.

V.

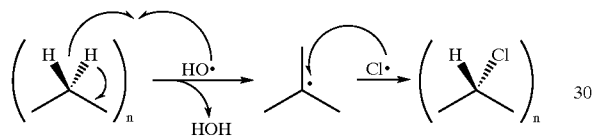

Similar theoretic mechanisms for activation of hypochlorous acid can be presented using acetic anhydride as outlined in Equation VI.

VI.

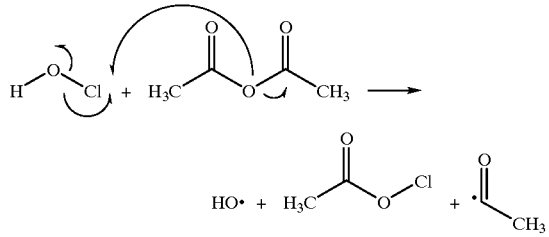

In such cases, further decomposition of the formed species would likely occur in manners such as that outlined in Equation VII.

VII.

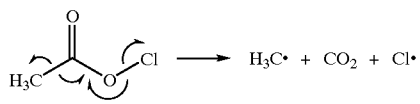

An alternate theoretic mechanism for decomposition of acetic anhydride is set forth in equation VIII. Acetic anhydride acts as a lewis acid attracting hypochloride ion present in solution to produce an activated oxidizer and a carboxylate salt. See Equation VIII below.

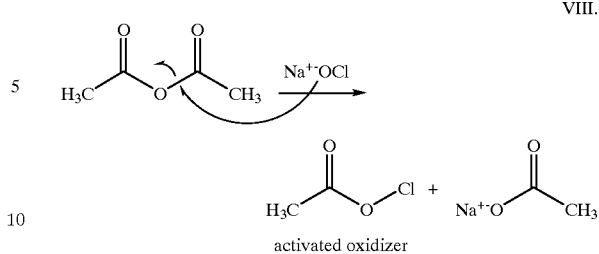

VIII.

activated oxidizer

The activated oxidizer interacts with the polymeric matrix to yield a polymeric substrate reactive to either carboxylate radicals as outlined in Equation IXa or chlorine radicals as outlined in Equation IXb.

IXa.

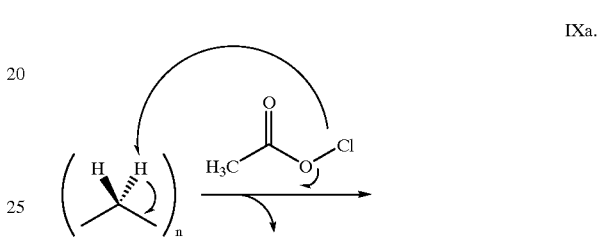

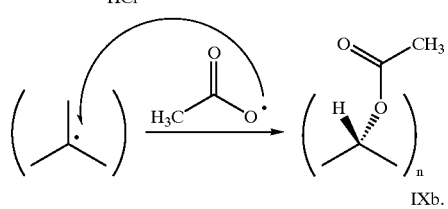

IXb.

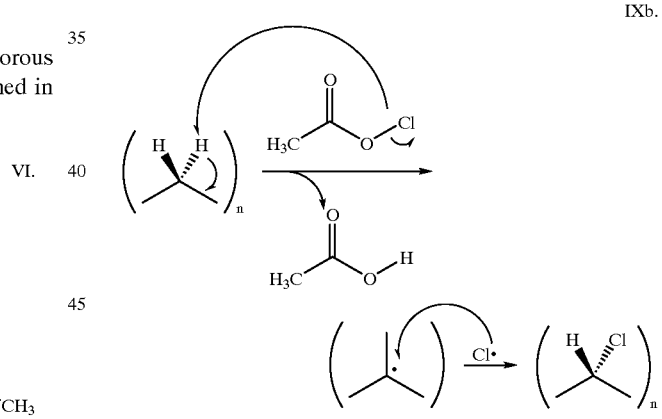

It is to be understood that the reaction mechanisms discussed are hypothetical. Without being bound to any theory, it is surmised that the foregoing provides depiction of possible reaction mechanisms occurring in the process of the present invention.

Thus, it is theorized that the process of the present invention results in the addition of discrete functionality at locations in the polymeric matrix previously occupied by a hydrogen atom. Because this reaction is limited to the polymeric matrix at or near the exterior surface of the article to be treated, localized addition of functionality does not unduly compromise performance characteristics of the polymer as may occur with integration of functionality throughout the substrate.

This is particularly important when treating polymeric materials in which there are few or no functional groups initially, such as is the case with polyethylene and polypropylene. By the process of the present invention, desired functional groups can be inserted into the matrix in a randomized fashion at locations proximate to the exterior surface. The added functionality provides greater chemical and mechanochemical interaction with the material to be adhered, eg. paint.

The following Table and test data illustrate various formulations and experimental results according to the present invention, and illustrate the longevity of the various formulation baths before the baths had to be replaced and/or regenerated. It is to be understood that the following Table and test data contain formulations provided for illustrative purposes and are not to be construed as limiting the scope of the present invention.

Paint adhesion was examined using test method ASTM D3359-78, wherein the painted surface was cross-hatched; a piece of transparent tape was secured to the surface; and the tape was then peeled off at about a 90° angle. Paint adhesion was also examined by a variation of test method ASTM D3359-78 wherein the painted surface was not cross-hatched. In the following experiments, the bath was considered operative until subsequent painting (with 2 coats of RUST-OLEUM Gloss Protective Spray Enamel, Gloss Black 7779) and testing of sample pieces revealed a drop of adhesiveness to paint of approximately 50% from a starting adhesiveness of >98% as measured qualitatively by visual inspection. The drop was generally sudden.

For the experiments characterizing bath life described below, the treatment time was 24 hours. All these experiments were executed at room temperature (RT).

| EXPERIMENT | FORMULATION | BATH LIFE (DAYS) |
|---|---|---|
| I | 40 mLs bleach<br>1 mL $Ac_2O$[1] | 1 |
| II | 50 mLs bleach<br>1 mL $Ac_2O$ | 1 |
| III | 50 mLs bleach<br>50 mLs phosphate buffer<br>6 mLs $Ac_2O$ | 2 |
| IV | 50 mLs bleach<br>50 mLs $H_2O$<br>1 mL $Ac_2O$ | 7 |
| V | 50 mLs bleach<br>50 mLs phosphate buffer<br>1 mL $Ac_2O$ | 5 |
| VI* | 5 mLs bleach<br>50 mLs $H_2O$<br>1 mL $Ac_2O$ | 5 |
| VII* | 25 mLs bleach<br>50 mLs $H_2O$<br>1 mL $Ac_2O$ | 5 |

[1]Acetic anhydride
*The VI and VII results were slightly worse than those of IV and V.

Miscellaneous experimentation revealed the following data: 1. It was found that 50% $H_2O_2$ did not yield adhesion after six days at room temperature; 2. Polymer dispersions and NaOH decrease effectiveness of treatment; 3. Elmer's Contact Cement and Testor's Plastic Cement exhibit poor adhesion to treated PE and PP. Dow Silicone Adhesive exhibited excellent adhesion to PE and PP pieces; 4. $Ca(OCl)_2$ could be used in place of NaOCl to prepare adhesive surfaces; 5. It was found that $Cl_2$ gas and $Cl_2$ in solution prepared by adding HCl to bleach provided adhesive surfaces on PE; and 6. The effects of added glycerol and KOAc were also examined and provided decreased performance.

Although the exposure method described in the present invention is that of dipping the polymer into a bath containing the treatment solution, it is to be understood that the polymer may be exposed to the treatment solution by any suitable method, including but not limited to spraying a heated treatment mist onto the polymer, spraying a treatment mist onto a heated polymer, and the like.

The present invention provides a novel, greatly improved chemical method for enhancing the adhesive properties of polymer surfaces, for example, the surfaces of olefinic polymers such as polyethylene and polypropylene. The inventive method includes, but is not limited to the following advantages: it is relatively non-toxic, highly effective, and very fast.

Possible applications for the present inventive method may include, but are not limited to an expanded use of polymers, such as, for example, olefinic polymers such as polyethylene and/or polypropylene, for: paintable auto parts; house and garden products; medical devices coated with biocompatible materials; new manufacturing techniques involving gluing polyethylene and/or polypropylene pieces together (a replacement for heat welding and mechanical joints); use of polyethylene and/or polypropylene films as laminates to prepare chemical resistant surfaces; and for providing containers and structural components with increased physical properties.

To further illustrate the composition, the following examples are given. It is to be understood that these examples are provided for illustrative purposes and are not to be construed as limiting the scope of the present invention.

EXAMPLE 1

Approximately 1.25 inch by 1.25 inch squares of high density polyethylene (HDPE) were chosen as samples. The HDPE samples were processed by structural foam injection molding, and could contain up to 4% white pigment and blowing agent, and up to 10% calcium carbonate. The samples were immersed in a standard bleach solution commercially available from the Clorox Company under the trademark CLOROX (5.25% sodium hypochlorite) for 48 hours at room temperature. The thus treated samples were painted with KRYLON ColorWorks Spray CWA1150 Gloss Black, Quick Dry Lacquer. Paint adhesion was examined by test method ASTM D3359-78 wherein the painted surface was cross-hatched; a piece of transparent tape was secured to the surface; and the tape was then peeled off at about a 90° angle. Paint adhesion was also examined by a variation of test method ASTM D3359-78 wherein the painted surface was not cross-hatched. Under either test method, adequate paint adhesion was noted upon visual inspection.

EXAMPLE 2

Calcium hypochlorite solutions were prepared by dissolving a commercial brand of 67% calcium hypochlorite in water to make a saturated solution. Several approximately 1.25 inch by 1.25 inch squares of high density polyethylene (HDPE) (formed by injection molding as described in Example 1) samples were immersed in the solution for 48 hours at room temperature. The samples were then painted with KRYLON ColorWorks Spray CWA1150 Gloss Black, Quick Dry Lacquer. Paint adhesion (as determined using the test methods described in Example 1) to a slightly greater extent than that obtained in Example 1 was noted upon visual inspection.

EXAMPLE 3

Several polypropylene samples were boiled in the bleach solution of Example 1 for about one hour. The samples were then painted with KRYLON ColorWorks Spray CWA1150 Gloss Black, Quick Dry Lacquer. Excellent paint adhesion was noted upon visual inspection, as determined using the test methods described in Example 1.

EXAMPLE 4

Untreated polyethylene pieces were glued together using "Super Glue." The pieces were pulled apart easily. Untreated polypropylene pieces were glued together using "Super Glue." These pieces were also pulled apart easily. Polyethylene samples treated as in Example 3 were glued together using "Super Glue." These samples could not be pulled apart. Polypropylene samples treated as in Example 3 were glued together using "Super Glue." These samples could not be pulled apart.

EXAMPLE 5

Polyethylene and polypropylene samples were treated as in Example 3. The samples were then coated with a polyurethane oil gloss black enamel or an acrylic latex gloss black enamel. The test methods as described in Example 1 were used. For the polyurethane based paint, visual inspection revealed that adhesion of treated samples was significantly improved for both the polyethylene and polypropylene samples over that of the untreated samples. For the latex based paint, adhesion of treated samples was significantly improved, especially in the polyethylene samples, over that of the untreated samples. However, adhesion of the latex paint was worse than that of the polyurethane paint.

EXAMPLE 6

A solution was prepared comprising a sodium hypochlorite oxidizing agent and an acetic anhydride activating agent. The sodium hypochlorite was maintained in an aqueous solution at a concentration between about 2.6% and about 5.25% by volume. The acetic anhydride was maintained in the aqueous solution at a concentration between about 0.26% and 0.53% by volume. The solution was heated to about 60° C., and a toy boat formed from polyethylene was immersed in the heated solution for approximately two hours. The toy boat was then painted with a base coat of RUST-OLEUM Premium Auto Primer—Fast Drying Formula. Several different paints were then coated over this base coat. The boat was then subjected to repeated abuse during children's bath time. After approximately 30 baths, the paint was being stripped from primer as much as primer was being stripped from the surface of the toy boat, as determined by the ASTM D3359-78 cross-hatch method defined in Example 1.

EXAMPLE 7

A solution is prepared comprising a sodium hypochlorite oxidizing agent and an acetic anhydride activating agent. The sodium hypochlorite is maintained in an aqueous solution at a concentration between about 0.25% and 25% by volume. The acetic anhydride is maintained in the aqueous solution at a concentration between about 0.01% and 5.0% by volume. The solution is heated at or near boiling, and a toy boat formed from polyethylene is immersed in the heated solution for approximately one hour. The toy boat is then painted with a base coat of RUST-OLEUM Premium Auto Primer—Fast Drying Formula. Several different paints are then coated over this base coat. The boat is then subjected to repeated abuse during children's bath time. After approximately 30 baths, the paint is being stripped from primer as much as primer is being stripped from the surface of the toy boat, as determined by the ASTM D3359-78 cross-hatch method defined in Example 1.

EXAMPLE 8

A solution is prepared comprising a sodium hypochlorite oxidizing agent and an acetic anhydride activating agent. The sodium hypochlorite is maintained in an aqueous solution at a concentration between about 0.5% and about 5.25% by volume. The acetic anhydride is maintained in the aqueous solution at a concentration between about 0.05% and 0.53% by volume. The solution is heated at or near boiling, and a toy boat formed from polyethylene is immersed in the heated solution for approximately one hour. The toy boat is then painted with a base coat of RUST-OLEUM Premium Auto Primer—Fast Drying Formula. Several different paints are then coated over this base coat. The boat is then subjected to repeated abuse during children's bath time. After approximately 30 baths, the paint is being stripped from primer as much as primer is being stripped from the surface of the toy boat, as determined by the ASTM D3359-78 cross-hatch method defined in Example 1.

EXAMPLE 9

A solution was prepared comprising a sodium hypochlorite oxidizing agent and an acetic anhydride activating agent. The sodium hypochlorite was maintained in an aqueous solution at a concentration of about 2.62% by volume. The acetic anhydride was maintained in the aqueous solution at a concentration of about 0.4% by volume. The solution was heated to about 60° C., and twelve pieces of polyethylene were immersed in the heated solution for approximately two hours. The treated pieces were painted with RUST-OLEUM Gloss Protective Spray Enamel, Gloss Black 7779. The painted pieces were suspended from the upper rack of a dishwasher and run through 50 cycles on the "pots and pans" setting. Little to no loss in adhesion was noted, as determined by the ASTM D3359-78 cross-hatch method defined in Example 1.

EXAMPLE 10

A solution is prepared comprising a sodium hypochlorite oxidizing agent and an acetic anhydride activating agent. The sodium hypochlorite is maintained in an aqueous solution at a concentration of about 2.62% by volume. The acetic anhydride is maintained in the aqueous solution at a concentration of about 0.4% by volume. The solution is heated to about 60° C., and twelve pieces of polyethylene are immersed in the heated solution for approximately two hours. The treated pieces are painted with RUST-OLEUM Gloss Protective Spray Enamel, Gloss Black 7779. The painted pieces are suspended from the upper rack of a dishwasher and run through 100 cycles on the "pots and pans" setting. Little to no loss in adhesion is noted, as determined by the ASTM D3359-78 cross-hatch method defined in Example 1.

EXAMPLE 11

Approximately 1.25 inch by 1.25 inch squares of high density polyethylene (HDPE) were chosen as samples, which samples were formed by injection molding, as described in Example 1. A side by side small scale production run using the HDPE samples compared the use of oxalic acid (specifically, oxalic acid dihydrate, $(HO_2C)_2 \cdot 2\ H_2O$)

versus acetic anhydride as the activating agent. Two treatment baths were set up. Bath # 1 contained 50 mLs of CLOROX bleach, 50 mLs of water; and Bath # 2 contained 50 mLs of CLOROX bleach, 50 mLs of water. Both baths were heated to approximately 70° C. 1 mL of acetic anhydride was then added to Bath # 1; and 1 gram of oxalic acid dihydrate was added to Bath # 2. The runs varied from 1 to 1.5 hours, and averaged 12 pieces of polyethylene treated per run per bath. The sample pieces were then painted with 2 coats of RUST-OLEUM Gloss Protective Spray Enamel, Gloss Black 7779. The treatment baths were considered to be exhausted (ie. the maximum number of sample pieces had been treated) when subsequent painting and testing of sample pieces revealed that approximately 40% of the paint could be removed using the ASTM variant test method as defined in Example 1. The drop of adhesiveness to paint was generally sudden. The results were as follows:

| Parameter | Bath #1 | Bath #2 |
| --- | --- | --- |
| Total # of Pieces Treated | 37 | 48 |
| Cost of Materials (¢)* | 2.9 | 3.1 |
| Cost per Square Foot (¢)* | 3.6 | 3.0 |

*The cost did not include heat or water. The acetic anhydride and oxalic acid were priced in a 1996–97 Aldrich Chemical Company catalog.

Oxalic acid was able to treat a greater number of parts at a reduced cost.

EXAMPLE 12

Approximately 1.25 inch by 1.25 inch squares of high density polyethylene (HDPE) were chosen as samples. The HDPE samples were processed by structural foam injection molding, as described in Example 1. The effectiveness of bath regeneration was examined. The bath was considered operative until subsequent painting (with 2 coats of RUST-OLEUM Gloss Protective Spray Enamel, Gloss Black 7779) and testing of sample pieces revealed a drop of adhesiveness to paint (using the ASTM variant method defined in Example 1) of approximately 50% from a starting adhesiveness of >98% as measured qualitatively by visual inspection. The drop was generally sudden. The maximum number of pieces (and number of runs) treated prior to bath failure is indicated in the following table.

| Experiment | Formulation | Temp. (RT or ° C.) | Time per run (hours) | # Pieces (runs) |
| --- | --- | --- | --- | --- |
| A | glass container 25 mLs bleach 60 mLs H$_2$O 1 mL Ac$_2$O[1] | RT | 5 | 42 (3 runs) |
| B | HDPE container 25 mLs bleach 60 mLs H$_2$O 1 mL Ac$_2$O | RT | 5 | 16 (1 run) |
| C | aluminum liner 25 mLs bleach 60 mLs H$_2$O 1 mL Ac$_2$O | RT | 5 | 15 (1 run) |
| D[2] | glass container 37 mLs bleach 37 mLs H$_2$O 5 mL Ac$_2$O | 50–55 | 2 | 168 (12 runs) |

[1]acetic anhydride
[2]This bath was regenerated between each run with 9 mLs bleach and 1 mL acetic anhydride. Results from this bath were far better than with any previous baths.

The cost of reagents was $1.29 for 1 gallon of CLOROX bleach and $11.02 per kg of Ac$_2$O (Aldrich Chemical Company, 1997 Catalog). The edges of the samples examined were significantly wide but not included in the following analysis.

In Experiment A, the cost of treatment (not including water) was 1.31¢ per square foot. That would be equivalent to 84¢ to treat both sides of a 4×8 sheet. (It is believed that 6 to 7 hours per run would have been optimal).

In Experiment D, the cost of treatment (not including heat or water) was 5.18¢ per square foot. That would be equivalent to $3.32 to treat both sides of a 4×8 sheet.

EXAMPLE 13

A solution was prepared as in Example 6, and was heated to about 60° C. Approximately 1.25 inch by 1.25 inch squares of high density polyethylene (HDPE) (formed by injection molding as described in Example 1) were immersed in the solution for 2 hours. The treated samples were then painted with RUST-OLEUM Premium Auto Primer—Fast Drying Formula; and then 4 coats of SHERWIN WILLIAMS Prep Rite, Pro Block—Interior/Exterior Primer Sealer (White 600-6266, B51-W20). Excellent paint adhesion was noted upon visual inspection, as determined using the test methods described in Example 1.

EXAMPLE 14

A solution was prepared containing 80 mLs CLOROX bleach; and 5 mLs acetic anhydride. Approximately 1.25 inch by 1.25 inch squares of high density polyethylene (HDPE) (formed by injection molding as described in Example 1) were boiled in the solution for 2 minutes. Greater than 99% paint adhesion was noted upon visual inspection, as determined using the test methods described in Example 1.

EXAMPLE 15

A solution is prepared comprising a sodium hypochlorite oxidizing agent and an acetic anhydride activating agent. The sodium hypochlorite is maintained in an aqueous solution at a concentration between about 2.6% and about 5.25% by volume. The acetic anhydride is maintained in the aqueous solution at a concentration between about 0.26% and 0.53% by volume. A toy boat is formed from at least one of, or a mixture of the following polymers: polyethylene, polypropylene, polystyrene, polyisobutylene, polyvinyl chloride, polyacrylonitrile, polymethyl acrylate, polymethyl methacrylate, polytetrafluoroethylene, polyformaldehyde, polyacetaldehyde, polyisoprene, polyethylene terephthalate, polyamides, polyesters, polyurethanes, polysiloxanes, polyphenolformaldehydes, ureaformaldehydes, melamine formaldehydes, celluloses, polysulfides, polyacetates, polycarbonates, thermoplastic elastomers, ABS, and SAN. The boat is boiled in the solution for about one hour, and is then painted with a base coat of RUST-OLEUM Premium Auto Primer—Fast Drying Formula. Several different paints are then coated over this base coat. The boat is then subjected to repeated abuse during children's bath time. After approximately 30 baths, the paint is being stripped from primer as much as primer is being stripped from the surface of the toy boat, as determined by the ASTM D3359-78 cross-hatch method defined in Example 1.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for improving adhesion characteristics of a polymeric material, comprising the steps of:

contacting the polymeric material with a composition containing at least one oxidizing agent, said oxidizing agent present in a kinetically degrading state which produces at least one chemical intermediate reactive with the polymeric substrate in a controlled reaction mechanism; and maintaining contact between the polymeric material and the composition for an interval sufficient to impart functional groups derived from said oxidizing agent into the polymeric material;

wherein said oxidizing agent is a bivalent oxygen compound selected from the group consisting of oxycompounds of chlorine, oxycompounds of bromine, oxycompounds of iodine, oxycompounds of boron, oxycompounds of nitrogen and mixtures thereof.

2. The method of claim 1 wherein said bivalent oxygen compound is selected from the group consisting of:

oxycompounds of chlorine selected from the group consisting of hypochlorous acid, alkali metal salts of hypochlorous acid and hydrates thereof, alkaline earth metal salts of hypochlorous acid and hydrates thereof, perchloric acid, alkali metal salts of perchloric acid and hydrates thereof, chloric acid, alkali metal salts of chloric acid and hydrates thereof, alkaline earth metal salts of chloric acid and hydrates thereof;

oxycompounds of bromine selected from the group consisting of hypobromous acid, alkali metal salts of hypobromous acid and hydrates thereof, alkaline earth metal salts of hypobromous acid and hydrates thereof, bromic acid, alkali and alkaline earth metal salts of bromic acid and hydrates thereof;

oxycompounds of iodine selected from the group consisting of iodic acid, alkali and alkaline earth metal salts of iodic acid and hydrates thereof, periodic acid, alkali and alkaline earth metal salts of periodic acid and hydrates thereof;

oxycompounds of boron selected from the group consisting of boric acid, alkaline earth and alkali metal salts and hydrates thereof, alkali perborates and hydrates thereof, alkaline earth metal perborates and hydrates thereof;

oxycompounds of nitrogen selected from the group consisting of nitric acid, alkali and alkaline earth metal salts of nitric acid and hydrates thereof; and mixtures thereof.

3. The method of claim 1 further comprising the step of reacting said oxidizing agent with an activating agent which preferentially reacts with said oxidizing agent to produce said at least one intermediate reactive with the polymeric substrate, said activating agent selected from the group consisting of carboxylic acids, anhydride derivatives of carboxylic acids, acid halide derivatives of carboxylic acids, sulfonic acid derivatives of carboxylic acids, selenic acid derivatives of carboxylic acids, perchloric acid derivatives of carboxylic acid, boric acid derivatives of carboxylic acid, dicarboxylic acid, anhydride derivatives of dicarboxylic acid, acid halide derivatives of dicarboxylic acid, sulfonic acid derivatives of dicarboxylic acids, selenic acid derivatives of dicarboxylic acid, perchloric acid derivatives of dicarboxylic acid, boric acid derivatives of dicarboxylic acid, synthetic equivalents thereof, and mixtures thereof.

4. The method of claim 3 wherein the carboxylic acid has the general formula:

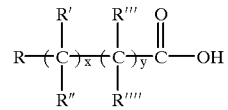

wherein x and y are integers between 0 and 20 inclusive, with the sum of x and y being an integer of 20 or less, wherein R is a functionality selected from the group consisting of substituted or unsubstituted aromatic hydrocarbon groups, branched or unbranched alkyl groups, the alkyl group having between 1 and 27 carbon atoms, and mixtures thereof, and wherein each variable R', R", R'" and R"" is a functionality selected from the group consisting of hydrogen, amines, hydroxyl, phenyl, phenol radicals, and mixtures thereof, each of the above-mentioned R variable functionalities being chosen independently of the other R variable functionalities, and wherein R" may also be selected from the group consisting of anhydrides, halide salts, selenic acid salts, perchloric acid salts, boric acid salts, and mixtures thereof; and wherein the dicarboxylic acid has the general formula:

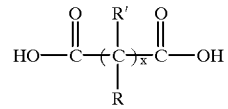

wherein x is an integer between 1 and 20 inclusive and R and R' are functionalities selected from the group consisting of hydrogen, hydroxyl radicals, amines, phenyl radicals and mixtures thereof.

5. The method of claim 3 wherein said contacting step occurs at a temperature between about 20° C. and a temperature at which decomposition of the polymeric substrate commences.

6. The method of claim 5 wherein the polymeric substrate is selected from the group consisting of:

a) addition polymers selected from the group consisting of polyethylene, polypropylene, polystyrene, polyisobutylene, polyvinyl chloride, polyacrylonitrile, polymethyl acrylate, polymethyl methacrylate, polytetrafluoroethylene, polyformaldehyde, polyacetaldehyde, polyisoprene, and mixtures thereof;

b) condensation polymers selected from the group consisting of polyamides, polyesters, polyurethanes, polysiloxanes, polyphenolformaldehydes, ureaformaldehydes, melamine formaldehydes, celluloses, polysulfides, polyacetates, polycarbonates, and mixtures thereof;

c) thermoplastic elastomers selected from the group consisting of styrene-isoprene-styrene, styrene-butadiene-styrene, copolyesters, copolyester ethers, silicone-polyamides, silicone-polyesters, silicone-polyolefins, silicone-styrenes, aromatic polyether-urethanes, alpha cellulose filled ureas, polyvinyl chloride-acetates, vinylbutyrals, and mixtures thereof;

d) co-polymers selected from the group consisting of polyester-polyethers, polyether-polysiloxanes polysiloxane-polyamides, polyesteramides, copolyamides, nylons, and mixtures thereof; and e) mixtures thereof.

7. The method of claim 6 wherein the polymeric substrate is selected from the group consisting of polyethylenes, polypropylenes, polyesters, thermoplastic elastomers, and mixtures thereof.

8. The method of claim 7 wherein the polymeric substrate is a polyester selected from the group consisting of polybutylene terephthalate, polyethylene terephthalate, and mixtures thereof.

9. The method of claim 3 wherein said reacting step in which said oxidizing agent is reacted with said activating agent occurs in an aqueous environment in presence of the polymeric substrate.

10. The method of claim 9 wherein the reaction between said oxidizing agent and said activating agent occurs at a rate essentially equal to reaction between said polymeric substrate and the reaction intermediate.

11. The method of claim 3 wherein the oxidizing agent is maintained in an aqueous solution at a concentration between about 0.25% and 25% by volume, and wherein the activating agent is maintained in said aqueous solution at a concentration between about 0.01% and 5.00% by volume.

12. A method for improving adhesion characteristics of a polymeric substrate comprising the steps of:

contacting at least a portion of surface area of the polymeric substrate with a fluid material containing at least one oxidizing agent, said oxidizing agent present in a kinetically degrading state which produces at least one chemical intermediate reactive with the polymeric substrate in a controlled reaction mechanism;

maintaining contact between the surface area portion of the polymeric substrate and the fluid area for an interval sufficient to impart functional groups derived from said oxidizing agent into the polymeric substrate; and reacting said oxidizing agent with an activating agent which preferentially reacts with said oxidizing agent to produce said at least one intermediate reactive with the polymeric substrate;

wherein said oxidizing agent is a bivalent oxygen compound selected from the group consisting of oxycompounds of chlorine, oxycompounds of bromine, oxycompounds of iodine, oxycompounds of boron, oxycompounds of nitrogen and mixtures thereof.

13. The method of claim 12 wherein the oxidizing agent is maintained in an aqueous solution at a concentration between about 2.6% and about 5.25% by volume, and wherein the activating agent is maintained in said aqueous solution at a concentration between about 0.26% and 0.53% by volume.

14. The method of claim 12 wherein said activating agent is selected from the group consisting of carboxylic acids, anhydride derivatives of carboxylic acids, acid halide derivatives of carboxylic acids, sulfonic acid derivatives of carboxylic acids, selenic acid derivatives of carboxylic acids, perchloric acid derivatives of carboxylic acid, boric acid derivatives of carboxylic acid, dicarboxylic acid, anhydride derivatives of dicarboxylic acid, acid halide derivatives of dicarboxylic acid, sulfonic acid derivatives of dicarboxylic acids, selenic acid derivatives of dicarboxylic acid, perchloric acid derivatives of dicarboxylic acid, boric acid derivatives of dicarboxylic acid, synthetic equivalents thereof, and mixtures thereof.

15. The method of claim 14 wherein said activating agent is selected from the group consisting of acetic anhydride, oxalic acid, formic acid, and mixtures thereof.

16. The method of claim 12 wherein said bivalent oxygen compound is selected from the group consisting of:

a) oxycompounds of chlorine selected from the group consisting of hypochlorous acid, alkali metal salts of hypochlorous acid and hydrates thereof, alkaline earth metal salts of hypochlorous acid and hydrates thereof, perchloric acid, alkali metal salts of perchloric acid and hydrates thereof, chloric acid, alkali metal salts of chloric acid and hydrates thereof, alkaline earth metal salts of chloric acid and hydrates thereof;

b) oxycompounds of bromine selected from the group consisting of hypobromous acid, alkali metal salts of hypobromous acid and hydrates thereof, alkaline earth metal salts of hypobromous acid and hydrates thereof, bromic acid, alkali and alkaline earth metal salts of bromic acid and hydrates thereof;

c) oxycompounds of iodine selected from the group consisting of iodic acid, alkali and alkaline earth metal salts of iodic acid and hydrates thereof, periodic acid, alkali and alkaline earth metal salts of periodic acid and hydrates thereof;

d) oxycompounds of boron selected from the group consisting of boric acid, alkaline earth and alkali metal salts and hydrates thereof, alkali perborates and hydrates thereof, alkaline earth metal perborates and hydrates thereof;

e) oxycompounds of nitrogen selected from the group consisting of nitric acid, alkali and alkaline earth metal salts of nitric acid and hydrates thereof; and f) mixtures thereof.

17. The method of claim 16 wherein said oxidizing agent is selected from the group consisting of sodium hypochlorite, calcium hypochlorite, calcium hypochlorite tetrahydrate, and mixtures thereof.

18. The method of claim 12 wherein said contacting step occurs at a temperature between about 20° C. and a temperature at which decomposition of the polymeric substrate commences.

19. The method of claim 18 wherein the polymeric substrate is selected from the group consisting of:

a) addition polymers selected from the group consisting of polyethylene, polypropylene, polystyrene, polyisobutylene, polyvinyl chloride, polyacrylonitrile, polymethyl acrylate, polymethyl methacrylate, polytetrafluoroethylene, polyformaldehyde, polyacetaldehyde, polyisoprene, and mixtures thereof;

b) condensation polymers selected from the group consisting of polyamides, polyesters, polyurethanes, polysiloxanes, polyphenolformaldehydes, ureaformaldehydes, melamine formaldehydes, celluloses, polysulfides, polyacetates, polycarbonates, and mixtures thereof;

c) thermoplastic elastomers selected from the group consisting of styrene-isoprene-styrene, styrene-butadiene-styrene, copolyesters, copolyester ethers, silicone-polyamides, silicone-polyesters, silicone-polyolefins, silicone-styrenes, aromatic polyether-urethanes, alpha cellulose filled ureas, polyvinyl chloride-acetates, vinylbutyrals, and mixtures thereof;

d) co-polymers selected from the group consisting of polyester-polyethers, polyether-polysiloxanes, polysiloxane-polyamides, polyesteramides, copolyamides, nylons, and mixtures thereof; and e) mixtures thereof.

20. The method of claim 19 wherein the polymeric substrate is selected from the group consisting of polyethylenes, polypropylenes, polyesters, thermoplastic elastomers, and mixtures thereof.

21. The method of claim 20 wherein the polymeric substrate is a polyester selected from the group consisting of polybutylene terephthalate, polyethylene terephthalate, and mixtures thereof.

22. The method of claim 12 wherein said reacting step in which said oxidizing agent is reacted with said activating agent occurs in an aqueous environment in presence of the polymeric substrate.

23. The method of claim 22 wherein the reaction between said oxidizing agent and said activating agent occurs at a rate essentially equal to reaction between said polymeric substrate and the reaction intermediate.

* * * * *